United States Patent [19]
Salsby

[11] 3,885,248
[45] May 27, 1975

[54] HUNTING VEST

[76] Inventor: Burton A. Salsby, 2428 S. Liberty Ave., Boise, Idaho 83705

[22] Filed: Mar. 7, 1974

[21] Appl. No.: 449,172

[52] U.S. Cl. .............................. 2/94; 2/46; 2/102; 2/92; 2/88; 224/7 B
[51] Int. Cl................................................ A41d 1/00
[58] Field of Search .......... 2/94, 102, 92, 115, 113, 2/88, 46, 51, 2, DIG. 1; 224/5 K, 7 B

[56] References Cited
UNITED STATES PATENTS

| | | | |
|---|---|---|---|
| 1,092,105 | 3/1914 | Holmes | 2/115 |
| 1,802,290 | 4/1931 | Thrower | 2/2 |
| 2,485,442 | 10/1949 | Halliday | 2/94 |
| 3,085,250 | 4/1963 | Finlay | 2/102 |

*Primary Examiner*—Richard J. Scanlan, Jr.
*Attorney, Agent, or Firm*—John W. Kraft; Charles L. Kraft

[57] ABSTRACT

The hunting kit comprises a hunting vest having a foundation mesh which generally covers the upper torso from the neck to the waist and having suitably located arm holes, and a back panel extending from above the collar and over the shoulders of the foundation mesh to a point below the upper thigh; and an entrails sack having a suitably reinforced mouth, a draw string to draw the mouth together and an open-work fabric body.

1 Claim, 5 Drawing Figures

PATENTED MAY 27 1975 3,885,248

3,885,248

HUNTING VEST

FIELD OF INVENTION

The present invention relates to hunting apparel, and more particularly to a hunting kit including a chemically protective hunting vest and an entrails sack.

DESCRIPTION OF THE PRIOR ART

It is widely known among big game hunters and butchers that, after an animal has been killed and field dressed, the animal carcass normally must be carried incarcass to a suitable place where the animal can be transported or cut into pieces. It is also well known that, while carrying the carcass, blood and similar staining material is transferred to a porter's clothes and the like. Various methods have been used to protect the clothing of the porter including wearing a commonly known raincoat. Raincoats, however, have been unsuccessful because they reduce freedom of movement and are excessively warm to work in.

It is also known that the animal, after initial cleaning, yields numerous valuable entrails such as heart, liver and the like which should be kept with the particular animal. Entrails may become lost, or the porter must return to collect the entrails. Thus, it would be an obvious advantage to provide a sack into which entrails may be placed while carrying the carcass and which would be provided with means to permit drainage of the entrails.

It is an object of the present invention to provide a hunting vest which protects portions of a porter contacted by the animal carcass from blood stains and the like, while permitting maximum freedom of movement.

It is a further object of this invention that the aforesaid hunting vest be included in a hunting kit having a sack in which the hunting vest may be conveniently carried.

It is another object of this invention that the aforesaid sack be operable as an entrail carrying sack which may be hung from the carcass of an animal and which includes means for carrying entrails.

These and other objects shall become apparent from the description following, it being understood that modifications may be made without affecting the teachings of the invention here set out.

SUMMARY OF THE INVENTION

The hunting kit comprises a hunting vest having a foundation mesh which generally covers the upper torso from the neck to the waist and having suitably located arm holes, and back panel extending from above the collar and over the shoulders of the foundation mesh to a point below the upper thigh; and an entrails sack having a suitably reinforced mouth, a draw string to draw the mouth together and an open-work fabric body. The hunting vest may be made of a flexible polymeric material, and may be provided with closure means such as buttons, snaps and the like or be left open. The entrails sack may also be made of a polymeric material or a similar material, and may include a hook which may be used to hang the entrails sack with the carcass of an animal.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
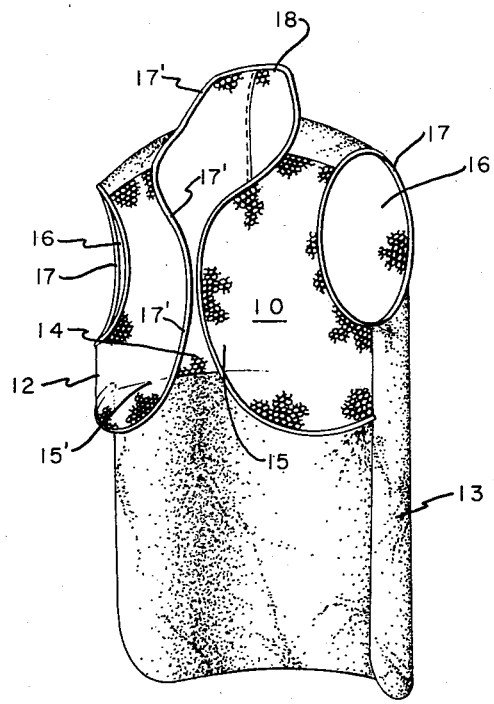
FIG. 1 is a left front perspective view of the hunting vest of this invention.
Figure 2:
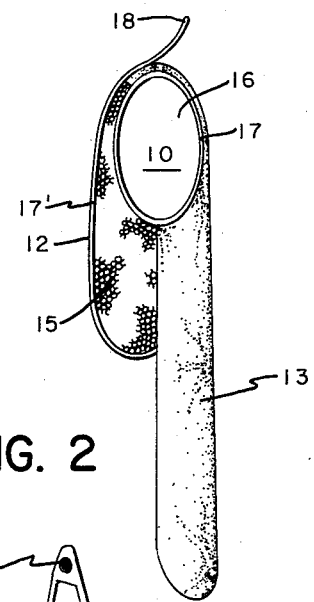
FIG. 2 is a left side elevational view of the apparatus of the FIG. 1.
Figure 3:
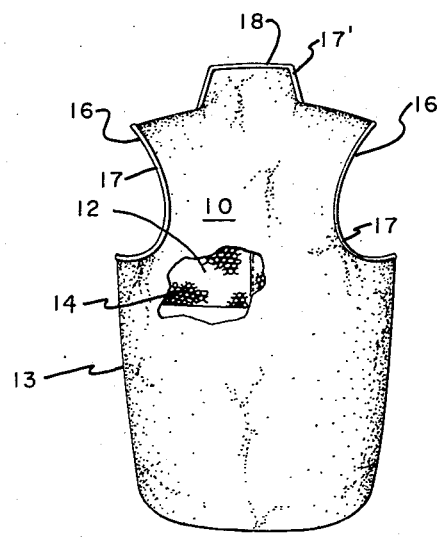
FIG. 3 is a rear elevational view of the hunting vest shown with the back cover panel broken away to show the foundation mesh.

Referring now to the drawings, the hunting kit of this invention includes a hunting vest 10 and an entrails sack 11. Referring now to the FIGS. 1, 2 and 3, the hunting vest 10 comprises a foundation mesh 12 and back panel 13. The foundation mesh 12 generally covers the upper torso from the neck to the waist and provides reinforcing to the back panel 13. The mesh 12 may be fabricated of an open-fabric material of polymeric strands, polymeric covered fibers and the like. The foundation mesh 12 may be conveniently divided into a back portion 14 and front portions 15 and 15'. The front panels 15 and 15' as the name indicates, covers the chest area and are bound at their uppermost terminal edges and adjacent terminal sides of the back portion 14. The front panels 15 and 15' may be unjoined or detachably joined according to the demands of design. Arm holes 16 are positioned to the upper portions of the sides of the mesh 12, and are suitably bound by a hem and binding 17 to prevent wear. The upper portion of the foundation mesh 12 is provided with an upstanding collar 18 which extends up the nape of the neck of the wearer's neck. The back panel 13 may be fabricated of a polymeric sheet.

The back panel 13 is secured to the back portion 14 of the foundation mesh 12, and extends over the shoulder of the vest 10, onto the upper portions of the front mesh portions 15 and 15'. The back panel 13 and adjacent portions of the foundation mesh 12 may be fabricated as separate suitably joined members, or as integrally fabricated and joined units. The back panel 13 is intended to extend from the uppermost terminal end of the collar 18 to a point below the hunter's upper thigh.

In operation, the wearer who has donned the hunting vest 10 may lift the gutted carcass of an animal grasping the forequarters of the animal and bring them over his shoulder such that the cavity lays adjacent the back panel 13 and the wearer's back. It will be noted that blood and the like is barred by the moisture resistant back panel 13, and will slide from the relatively long tail of the panel 13.

Figure 4:
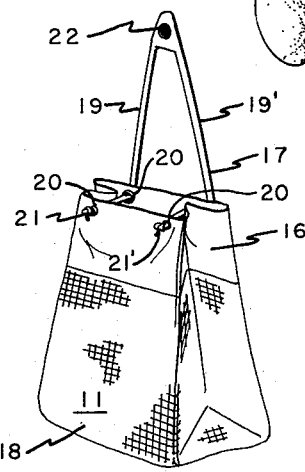
FIG. 4 is a right front perspective view of the entrails sack of this invention.
Figure 5:
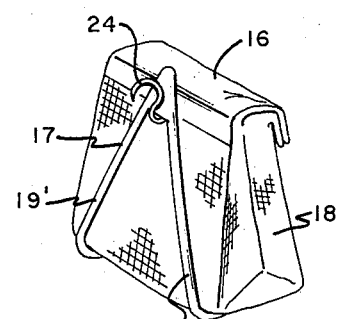
FIG. 5 is a left rear perspective view of the apparatus of the FIG. 4 shown as it would appear folded, with the hunting vest carried therein.

Referring to the FIGS. 4 and 5, the entrails sack 11 comprises a mouth 16, a draw string 17, and a body 18. The mouth 16 is a suitably thick flexible sheet material which may carry the weight of animal entrails or the vest 10. The mouth 16 may be made of any of a variety of materials such as canvas or polymeric sheet. The draw string 17 is fabricated from a suitable cord material into cord portions 19 and 19' which are fastened to each other at one of their terminal ends, and the terminal ends opposite the secured together ends of the portions 19 and 19' are disposed through grommeted holes 20 disposed in opposing sides distally from the uppermost terminal end of the mouth 16, and are secured by knots 21 and 21' respectively. The intersection at which the portions 19 and 19' are secured together is provided with a snap 22 which may be secured to it's mating snap (not shown) disposed on the mouth 16 on the side opposite the side from which the string 17 issues (indicated in the FIG. 5). It is intended that, when the entrails sack 11 is in its folded position, the string 17 is to be brought over the mouth 16, about the front, bottom and rear side of the sack 11 and fastened by means of snap 22 to it's mating snap (not shown) on the rear side of the sack 11. The body 18 is a continuous open-work fabric mesh which is bound at its uppermost terminal edge of the lowermost terminal edge of the mouth 16. An open-work mesh is provided to permit draining of entrails placed within the sack 11.

The vest 10 may be folded and placed within the entrails sack 11 and the draw string 17 brought about and secured to the sack as set out above. When the wearer is involved in animal dressing, he may don the hunting vest 10, as set out above, and may use the sack 11 to carry animal entrails and the like. The sack 11 may be conveniently hung on a suitable appendage of the animal carcass. It has also been found to advantage to provide a S-shaped hook 24 on which to hang the sack 11 as part of the hunting kit. The hook 24 may be placed at the joining terminal ends of the portions 19 and 19', and a cleat portion (not shown) may be embedded into the carcass.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A hunting vest having open-work foundation mesh which covers the upper torso from the neck to the waist having suitable armholes, said foundation mesh being fabricated of a suitable flexible polymeric mesh material; and a back panel of moisture-proof sheet material fastened to said foundation mesh extending from said collar to a point below the upper thigh and distally over the shoulders of said foundation mesh.

* * * * *